(12) United States Patent
Plusquellic

(10) Patent No.: US 10,671,350 B2
(45) Date of Patent: Jun. 2, 2020

(54) SYSTEMS AND METHODS FOR ANALYZING STABILITY USING METAL RESISTANCE VARIATIONS

(71) Applicant: STC.UNM, Albuquerque, NM (US)

(72) Inventor: James Plusquellic, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 16/051,427

(22) Filed: Jul. 31, 2018

(65) Prior Publication Data
US 2018/0349100 A1    Dec. 6, 2018

Related U.S. Application Data

(63) Continuation of application No. 14/907,423, filed as application No. PCT/US2014/053279 on Aug. 28, 2014, now Pat. No. 10,048,939.

(60) Provisional application No. 61/870,974, filed on Aug. 28, 2013.

(51) Int. Cl.
| | |
|---|---|
| G06F 7/58 | (2006.01) |
| G09C 1/00 | (2006.01) |
| H04L 9/00 | (2006.01) |
| H04L 9/08 | (2006.01) |

(52) U.S. Cl.
CPC ............... *G06F 7/588* (2013.01); *G09C 1/00* (2013.01); *H04L 9/002* (2013.01); *H04L 9/0866* (2013.01); *G06F 2207/58* (2013.01); *H04L 2209/12* (2013.01); *H04L 2209/26* (2013.01); *Y04S 40/24* (2013.01)

(58) Field of Classification Search
CPC .................................. G06F 7/58; G06F 7/588
See application file for complete search history.

(56) References Cited

U.S. PATENT DOCUMENTS

| | | |
|---|---|---|
| 5,155,445 A | 10/1992 | Frick et al. |
| 7,200,822 B1 | 4/2007 | McElvain |
| RE40,188 E | 3/2008 | Lofstrom |
| 8,525,169 B1 | 9/2013 | Edelstein et al. |
| 8,619,979 B2 | 12/2013 | Ficke et al. |
| 2003/0234735 A1 | 12/2003 | Kressin |
| 2010/0322418 A1 | 12/2010 | Potkonjak |
| 2012/0183135 A1 | 7/2012 | Paral et al. |
| 2012/0319724 A1 | 12/2012 | Plusquellic et al. |

(Continued)

FOREIGN PATENT DOCUMENTS

EP        2320344        5/2011

OTHER PUBLICATIONS

Raj Chakraborty et al : "A transmission gate physical unclonable function and on-chip voltage-to-digital conversion technique", May 29, 2013; May 29, 2013-Jun. 7, 2013, May 29, 2013 (May 29, 2013), pp. 1-10, XP058020114, DOI: 10.1145/2463209.2488806 ISBN: 978-1-4503-2071-9.

(Continued)

*Primary Examiner* — Chuong D Ngo
(74) *Attorney, Agent, or Firm* — Valauskas Corder LLC

(57) ABSTRACT

This disclosure describes techniques for analyzing statistical quality of bitstrings produced by a physical unclonable function (PUF). The PUF leverages resistance variations in the power grid wires of an integrated circuit. Temperature and voltage stability of the bitstrings are analyzed. The disclosure also describes converting a voltage drop into a digital code, wherein the conversion is resilient to simple and differential side-channel attacks.

10 Claims, 15 Drawing Sheets

(56) References Cited

U.S. PATENT DOCUMENTS

2013/0093502 A1    4/2013   Kim et al.
2014/0140513 A1    5/2014   BrightSky et al.

OTHER PUBLICATIONS

Ju J et al : "Stability analysis of a physical unclonable function based on metal resistance variations" , 2013 IEEE International Symposium on Hardware-Oriented Security and Trust (Host), IEEE, Jun. 2, 2013 (Jun. 2, 2013), pp. 143-150, XP032477290, DOI: 10.1109/HST2013.6581580 ISBN: 978-1-4799-0559-1 [retrieved on Aug. 14, 2013].

SYSTEMS AND METHODS FOR ANALYZING STABILITY USING METAL RESISTANCE VARIATIONS

This application is a continuation of U.S. National application Ser. No. 14/907,423, which claims the benefit of International Application PCT/US2014/053279 filed Aug. 28, 2014, which claims the benefit of U.S. Provisional Application No. 61/870,974, filed on Aug. 28, 2013, all of which are incorporated by reference.

STATEMENT REGARDING FEDERALLY SPONSORED RESEARCH OR DEVELOPMENT

This invention was made with government support under CNS1018748 awarded by National Science Foundation (NSF). The government has certain rights in the invention.

TECHNICAL FIELD

This disclosure relates to systems and methods for generating random bitstrings and more particularly, to Physical Unclonable Functions (PUFs).

BACKGROUND

Random bitstrings may form the basis for encryption, identification, authentication, and feature activation in hardware security. In current technologies, keying material for encryption may be stored as digital bitstrings in non-volatile memory on field-programmable gate arrays (FPGAs) and application-specific integrated circuit (ASICs). However, secrets stored this way may not be secure against a determined adversary, who can use probing attacks to steal the secret. Physical Unclonable Functions (PUFs) may be used as an alternative to storing digital bitstrings in non-volatile memory. PUFs may leverage random manufacturing variations in integrated circuits as the source of entropy for generating random bitstrings, and may incorporate an on-chip infrastructure for measuring and digitizing the corresponding variations.

The quality of a PUF may be judged based on one or more of uniqueness among a population, randomness of the bitstrings produced, and reproducibility or stability across varying environmental conditions (i.e., temperature and voltage). The quality of current PUFs may be less than ideal. Further, current techniques for determining the uniqueness, the randomness, and the stability of PUFs may be less than ideal.

SUMMARY

In general, this disclosure describes techniques for generating a physical unclonable function (PUF). In particular, this disclosure describes techniques for producing a PUF based on resistance variations. This disclosure describes analyzing statistical qualities of bitstrings produced by a PUF of a circuit. Specifically, a PUF that leverages resistance variations in the polysilicon and metal wires of the circuit is analyzed at different temperatures and voltages to determine its stability. The disclosure also describes converting a voltage drop of a circuit into a digital code, wherein the conversion is resilient to simple and differential side-channel attacks.

The details of one or more examples are set forth in the accompanying drawings and the description below. Other features, objects, and advantages will be apparent from the description and drawings, and from the claims.

DETAILED DESCRIPTION

Figure 1:
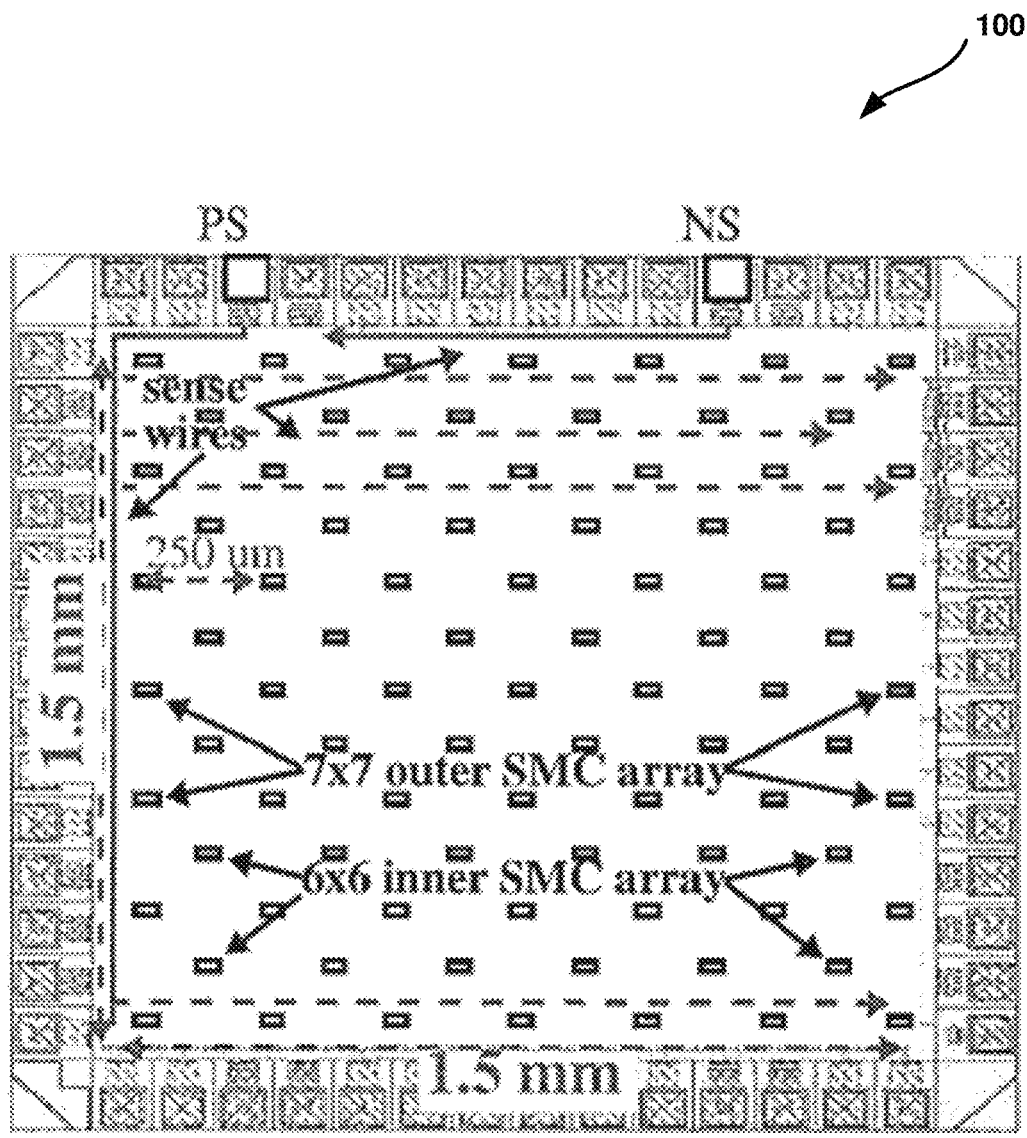
FIG. 1 is a block diagram illustrating an example of an integrated circuit architecture that may implement one or more techniques of this disclosure.

Physical Unclonable Functions (PUFs) are promising components for next generation integrated circuit (IC) security. PUFs derive random, but reproducible, bitstrings that can be used in security applications such as encryption, authentication, feature activation, metering, etc. Bitstrings may be generated on-the-fly using dedicated hardware primitives and processing engines, and thereby may avoid the need for storage in on-chip non-volatile memories. This feature may not only improve their resilience to invasive attacks designed to steal secret keying material, but may also reduce the cost of manufacturing an IC. That is, in many cases, PUFs may be designed using components that can be fabricated using standard CMOS processing steps, and therefore, the cost of integrating non-standard components, such as non-volatile memories, may be eliminated. Another important characteristic of PUFs as a next generation security mechanism is their potential for generating large numbers of repeatable random bits. This feature offers new opportunities for software processes to strengthen security mechanisms, for example, by allowing frequent rekeying in encrypted communication channels and by allowing a large, changing set of shared keys to be utilized among multiple communicating entities.

PUFs are designed to be sensitive to variations in the printed and implanted features of wires and transistors on the IC. Precise control over the fabrication of IC components is becoming more difficult in advanced technology generations, resulting in a wider range of electrical variations among and within the replicated copies of a chip. Signal variations that occur within the IC may be the source of entropy for the PUF. Example PUF implementations may leverage variations in transistor threshold voltages, in speckle patterns, in delay chains and ring oscillators, in thin-film transistors, in SRAMs, in leakage current, in metal resistance, in optics and phase change, in sensors, in switching variations, in sub-threshold design, in read only memories (ROMs), in buskeepers, in microprocessors, using lithography effects, and aging. It should be noted that PUFs may incorporate different types of on-chip infrastructures for measuring and digitizing the same type of variation. Although, in some examples, the techniques described herein are described with respect to PUFs based on metal resistance variations, the techniques described herein may be generally applicable to any type of PUF.

Several statistical criteria have emerged as important metrics for judging the quality of a PUF. Interchip hamming distance (HD) may be used to determine the uniqueness of bitstrings among a population of chips. Similarly, the National Institute of Standards and Technology (NIST) statistical test suite can be used to evaluate the randomness of the bitstrings produced by each chip. Intra-chip hamming distance (HD) may be used to evaluate stability of bitstrings. That is, the ability of each chip to reproduce the same bitstring time-after-time, under varying temperature and voltage conditions.

The ability of each chip to reproduce the same bitstring time-after-time may be described with respect to the ability of each chip to avoid bit flips, where a bit-flip may be defined as '0-to-1' and '1-to-0' change in a generated bitstring as temperature and voltage are varied. This disclosure describes an example PUF and evaluates its stability. Further, this disclosure describes an example bit-flip avoidance scheme that reduces the probability of a failure to reproduce the bitstring. The example bit-flip avoidance scheme was evaluated and shown to reduce the probability of a failure to reproduce the bitstring to less than 1E-9.

As described above, PUFs may incorporate different types of on-chip infrastructures for measuring and digitizing the same type of variation. Different types of on-chip infrastructures may provide different stabilities for a particular PUF. This disclosure describes example on-chip voltage-to-digital converters (VDC) for measuring voltage variations. In one example, voltage variations may reflect resistance variations in the metal wires. The stability of the example on-chip voltage-to-digital converter was evaluated at different temperatures and voltages.

FIG. 1 is a block diagram illustrating an example of an integrated circuit architecture that may implement one or more techniques of this disclosure. In the example illustrated in FIG. 1, chip 100 is based on a 90 nm chip architecture. In other examples, chip 100 may be based on other architectures (e.g., 65 nm, architectures 45, nm architectures, etc.) In one example, the 90 nm chip architecture may be fabricated using IBM's 90 nm, 9 metal layer bulk silicon process. As illustrated in FIG. 1, the padframe of chip 100 includes 56 I/Os, and surrounds a chip area of approx. 1.5 mm×1.5 mm. Two PADs labeled PS (Psense) and NS (Nsense) along the top of chip 100 refer to voltage sense connections, where PS may be used for sensing voltages near $V_{DD}$ and NS may be used for sensing voltages near GND. In the example illustrated in FIG. 1, each of PS and NS terminals wire onto chip 100 and connect to 85 copies of a Stimulus/Measure circuit (SMC). In the example illustrated in FIG. 1, the SMCs are illustrated as small rectangles and are distributed across entire chip 100 as two arrays, a 7×7 outer array and a 6×6 inner array (49 SMCs in outer array and 36 SMCs in inner array for a total of 85 SMCs). Although not shown in FIG. 1, a scan chain may connect serially to each of the SMCs to allow each of them to be controlled.

Figure 2:
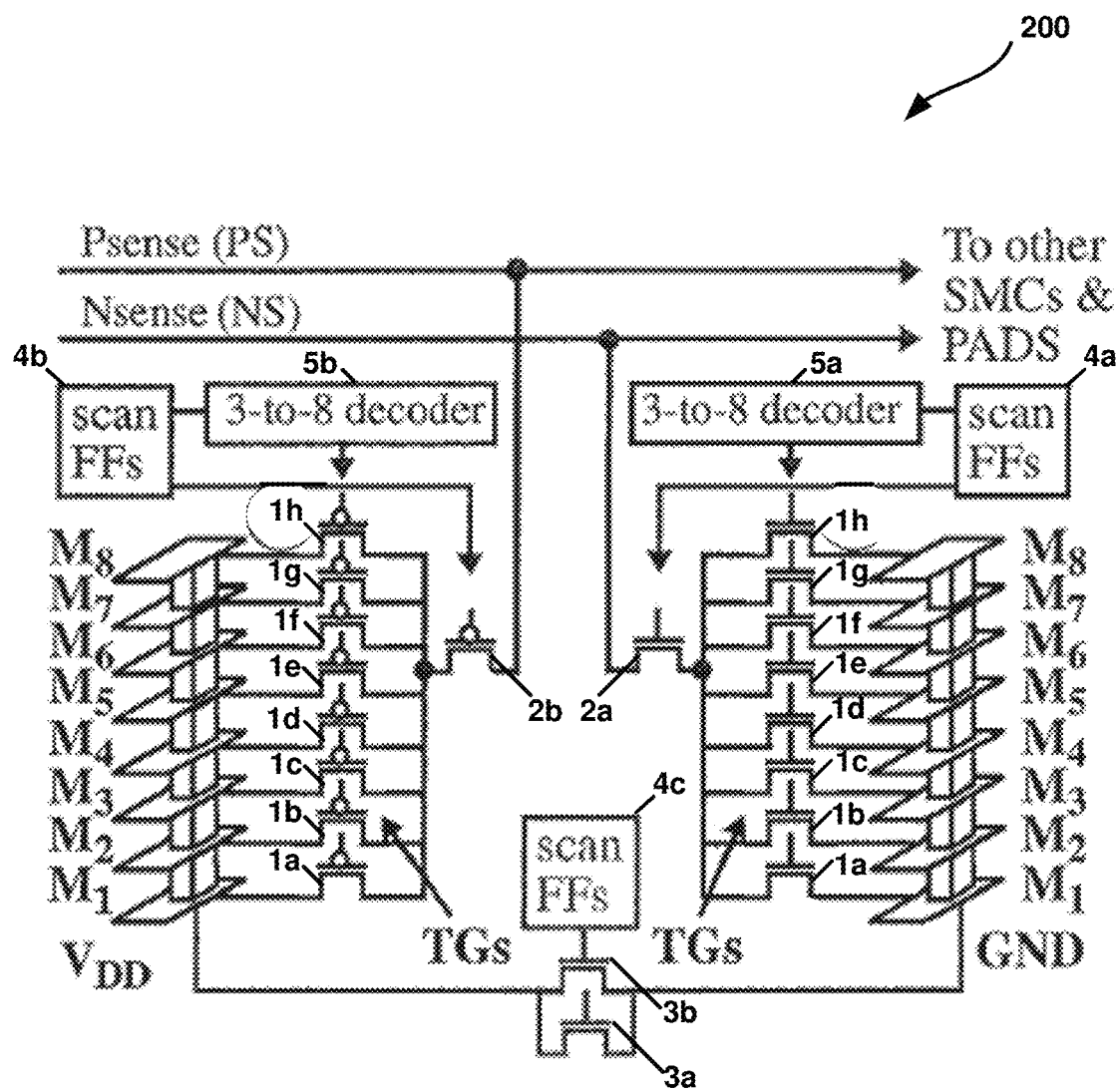
FIG. 2 is a schematic diagram illustrating an example of a Stimulus/Measure circuit (SMC) that may implement one or more techniques of this disclosure.

FIG. 2 is a schematic diagram illustrating an example of a Stimulus/Measure circuit (SMC) that may implement one or more techniques of this disclosure. In the example illustrated in FIG. 2, SMC 200 includes a pair of shorting transistors 3a and 3b. In one example, each of the shorting transistors may be capable of sinking approximately 10 mA of current through the power grid when enabled. In this example, the resulting voltage drop/rise on the $V_{DD}$ and GND, respectively may be less than 10 mV. As illustrated in FIG. 2, SMC 200 includes a set of 16 "pseudo" transmission gates (TGs), labeled 1a through 1h, in FIG. 2, that serve as voltage sense devices. As illustrated in FIG. 2, eight of the TGs 1a-1h connect to eight of the nine metal layers (the ninth metal layer is not shown in FIG. 2) that define the $V_{DD}$ stack-up of the power grid, as shown on the left side of FIG. 2 (labeled $M_1$ through $M_8$), while the other eight TGs 1a-1h connect to the GND stack-up, as shown on the right side of FIG. 2 (labeled $M_1$ through $M_8$).

In SMC 200, scan FFs 4a and 4b and 3-to-8 decoders 5a and 5b allow exactly one of the TGs to be enabled in each of the stack-ups. As illustrated in FIG. 2, SMC 200 includes additional TGs 2a and 2b that connect to the drains of the each of the 8 stack-up TGs, one for $V_{DD}$ and one for GND. Separate scan FFs control their connection to the chip-wide wires that route to the PS and NS pins illustrated in FIG. 1. The configuration and control mechanism of SMC 200 allows any $V_{DD}$ and GND voltage to be measured using off-chip voltmeters.

In one example, a challenge may be applied to circuit 100 by configuring the scan chain to (1) enable the shorting transistors within an SMC, and (2) enable two TGs in that same SMC. For example, with respect to SMC 200, shorting transistors 3a and 3b may be enabled and the TG labeled 2a and one TG from the group 1a through 1h may be enabled. Once the transistors are enabled, a voltage drop/rise may be measured on the NS and PS pads using voltmeters. A voltmeter may include an off-chip voltmeter or an on-chip voltmeter.

In one example, in order to reduce bias effects and correlations that exist in the $V_{DD}$ and GND stack-ups, inter-layer voltage drops/rises may be computed by subtracting pair-wise, the voltages measured from consecutive metal layers, i.e., $V_{M1}$-$V_{M2}$, $V_{M2}$-$V_{M3}$, etc. These voltage differences, which may be referred to as power grid voltage differences (PGVDs), may also allow the PUF to leverage the independent resistance variations that occur in each of the metal layers of the power grid. It should be noted that a significant benefit of using metal structures based PUF is that "noise-related" variations, such as those introduced by temperature and voltage (TV) variations, result in linear changes to the measured voltages. This linear scaling characteristic allows the relative magnitude of two voltages to remain consistent across changes in temperature and voltage, which, in turn, improves the stability of the PUF to bit-flips, when compared, for example to PUFs which leverage transistor-based variations.

The eight TGs in the respective $V_{DD}$ and GND stacks as shown in FIG. 2 indicate that 7 PGVDs can be computed per stack. However, it should be noted that the structure of the power grid on the chips may reduce the voltage drops on the upper layers of the power grid. Therefore, in some cases analysis can be restricted to PGVDs generated using the lower four metal layers (i.e., $M_1$ through $M_4$), which allows three PGVDs to be computed. Therefore, in one example, each chip 100 in a population may generate 85 SMCs*3 metal layer pairings=255 PGVDs for each of the $V_{DD}$ and GND stacks. Each of the PGVDs can be compared with other PGVDs in various combinations to produce a bitstring. In one example, analysis may be conducted on bitstrings generated by comparing each PGVD with all others generated using the same metal layer pairing. Therefore, in one example, the total number of bits per chip 100 may be equal to 85 SMCs*84/2 per metal layer pairing*3 metal layer pairings*2 grids=3,570*6=21,420 bits. Thus, in one example, circuit 100 may include 85 of SMC 200 and may be configured to implement a PUF capable of producing 21,420 bits. This PUF may be referred to in this disclosure generally as a power grid (PG) PUF and more particularly as $PGPUF_1$.

As described above, the quality of a PUF may be determined based on one or more of uniqueness, randomness, and stability. In one set of experiments, $PGPUF_1$ was evaluated at nine TV corners, i.e., over all combinations of three temperatures; negative 40° C., 25° C. and 85° C., and three voltages; nominal and +/−10% of nominal. The stability of the bitstrings produced using $PGPUF_1$ was measured using intra-chip HD and 'probability of failure' techniques. Further, the randomness and uniqueness of bitstrings produced using $PGPUF_1$ were also evaluated using the NIST test suite and inter-chip HD methods. It should be noted that the order in which the comparisons were made was randomized. In an on-chip implementation, this can be accomplished using a linear feedback shift register (LFSR) and a seed. In the experiments, digitized voltages were obtained from an off-chip voltmeter. The process of randomizing comparisons was modeled in experiments using the functions srand(seed) and rand( ) from the C programming library. Further, the randomness, uniqueness and stability characteristics of $PGPUF_1$ was evaluated for a set of 63 chips.

Based on the experiments it was found that unstable bits, defined as bits that are susceptible to flipping because their PGVDs are very similar, actually reduce several quality metrics associated with the overall bitstring, including inter-chip HD and NIST statistical test scores. Moreover, including unstable bits in a bitstring may require the inclusion of error correction and/or Helper Data schemes. Error correction and Helper Data schemes may weaken security and increase overhead. This disclosure describes an example bit-flip avoidance scheme that may be used to identify and discard unstable bits. The example bit-flip avoidance scheme may be used as an alternative to error correction and Helper Data schemes. The example bit-flip avoidance scheme may be referred to as thresholding.

Figures 3A, 3B:
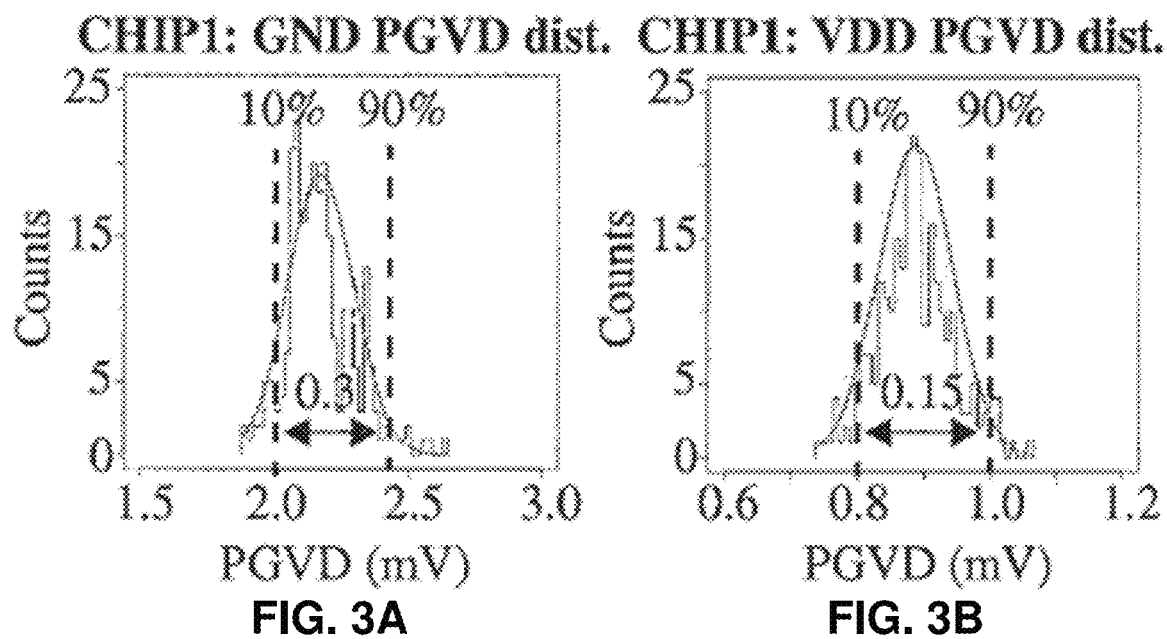
FIGS. 3A-3B are graphs illustrating example power grid voltage distributions for an example integrated circuit implementing one or more techniques of this disclosure.

Thresholding may be carried out by first computing a threshold from the distribution characteristics of the PGVDs. Computing a threshold from the distribution characteristics of the PGVD is illustrated in FIGS. 3A-3B. FIGS. 3A-3B are graphs illustrating example power grid voltage distributions for an integrated circuit. FIGS. 3A-3B illustrate the GND and $V_{DD}$ PGVD distributions for a sample chip, $CHIP_1$. Each distribution in FIG. 3A and FIG. 3B includes 255 PGVD values, derived as described above. That is, each chip 100 in a population may generate 85 SMCs*3 metal layer pairings=255 PGVDs for each of the $V_{DD}$ and GND stacks.

In the examples illustrated in FIGS. 3A-3B, the distance between the 10% and 90% points in the distributions is used to derive the thresholds for the thresholding algorithm. As illustrated in FIGS. 3A-3B, the distance between the 10% and 90% points are approximately 0.3 mV for GND PGVDs and 0.15 mV for the $V_{DD}$ PGVDs for this chip. The limits at 10% and 90% are used to avoid distortions caused by potential outliers in the PGVD values for each chip. In other examples, different percentages may be used to derive the thresholds (e.g., 5% and 95%, 15% and 85%, 20% and 80%).

Figure 4A:
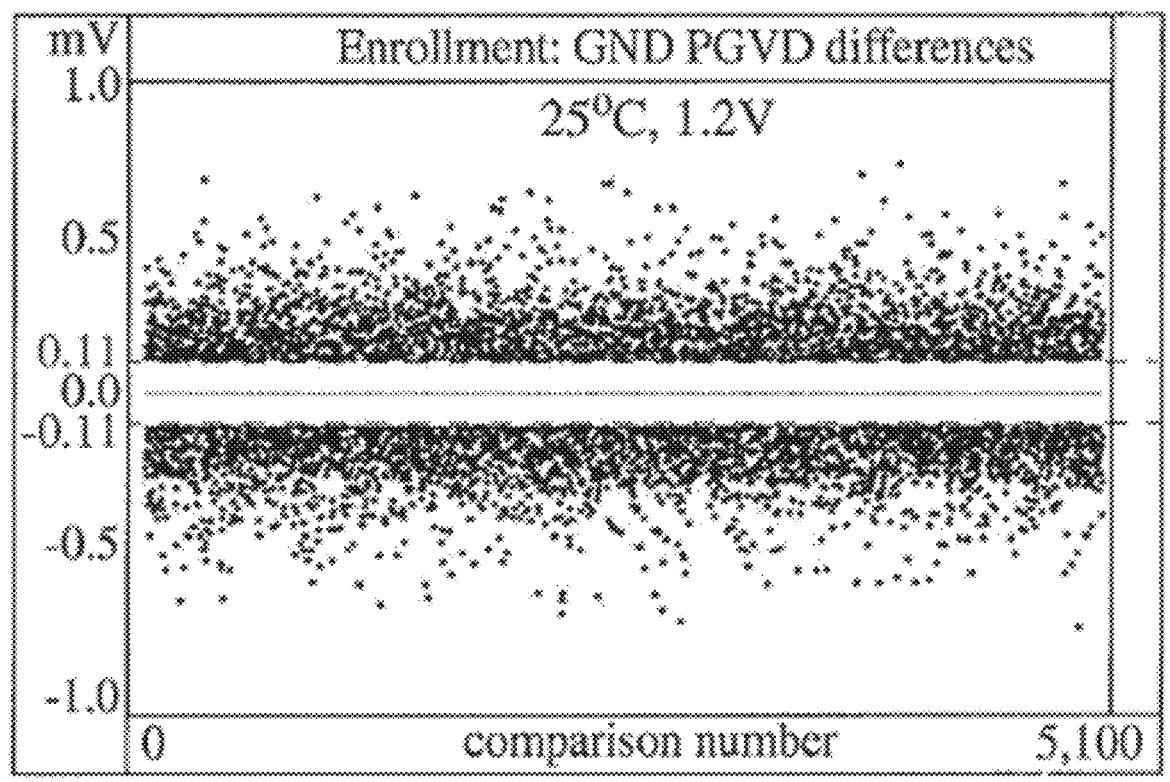
FIG. 4A-4B are graphs illustrating of an example bit generation process using an example PUF described herein.
Figure 4B:
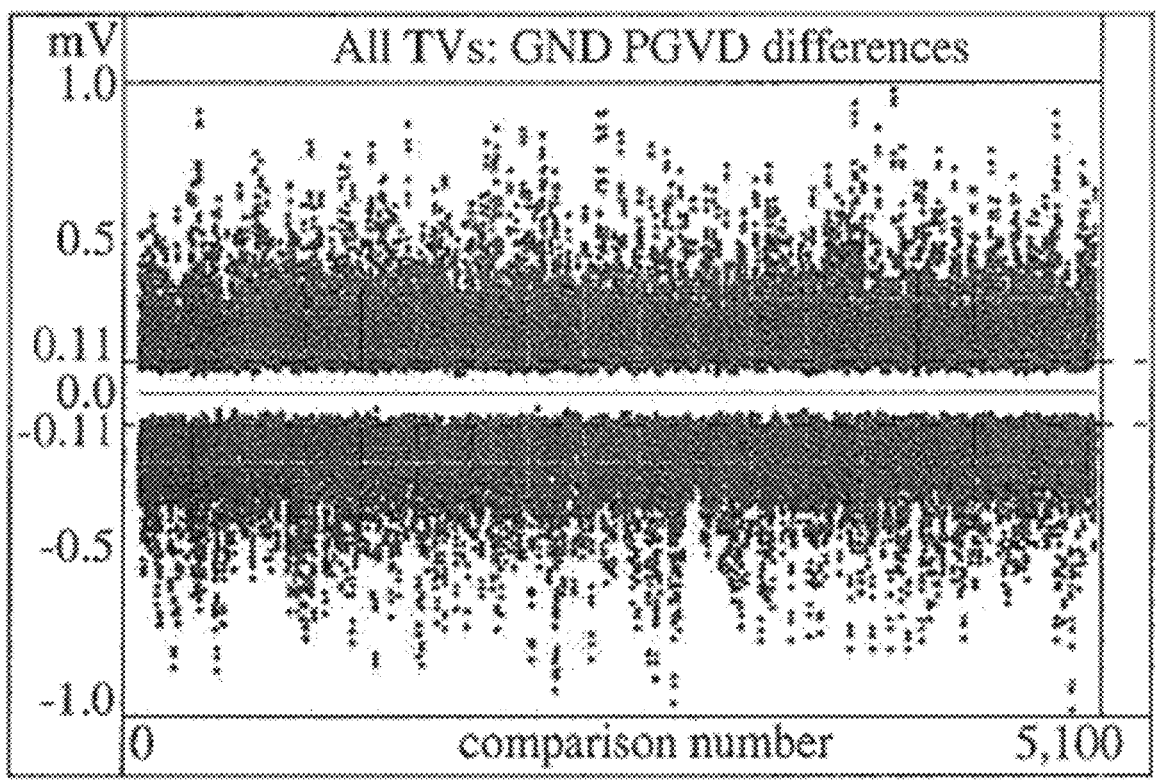

The thresholds may then be scaled by a constant to produce the actual threshold used during bit generation. FIG. 4A and FIG. 4B provide an illustration of the bit generation process using the GND PGVDs for CHIP'. Both the graph illustrated in FIG. 4A and the graph illustrated in FIG. 4B plot the bit comparison number along the x-axis against the value of the difference between the two PGVDs being compared. Only the bits that survive the thresholding are included in the plots, i.e., the x-axis shows only about half of the 10,710 comparisons. The bits that survive the thresholding may be referred to as strong bits. Points that appear in the upper portion of the FIGS. 4A-4B generate a '1' bit while points in the lower portion generate a '0' bit.

FIG. 4A shows only the points obtained from enrollment, which was carried out at 25° C., 1.2 V. The thresholds are depicted using two horizontal lines at 0.11 and −0.11 mV. These values were obtained by scaling the 0.3 mV obtained from the distribution (i.e., 10% and 90% points) by a constant of 0.37 (i.e., 0.3 mV*0.37=0.11 mV). It should be noted that in this example, the scalars 0.37 and 0.65 for the GND and $V_{DD}$ thresholds, respectively were determined to be sufficient to prevent bit flips in chips. In other examples, other scalars may be used. FIG. 4B adds in the data points from the remaining 8 TV (regeneration) corners. Close inspection of the graphs in FIGS. 4A-4B reveals that some of the data points from regeneration appear within the threshold band of width 0.22 mV, centered around 0.0 mV. Noise that occurs during regeneration causes points to move vertically, but as long as no points move across the 0.0 line, no bit-flips occur.

The usage scenario that enables this process to be applied in situations where exact regeneration of a bitstring is required works as follows. During the initial bitstring generation, thresholding is used to identify the unstable bits. For each unstable bit, its numbered position in the sequence of challenges applied to generate the bitstring is recorded in public storage. Later, during regeneration, thresholding is disabled and public memory is consulted to determine which challenges to apply during bit generation.

Figure 5:
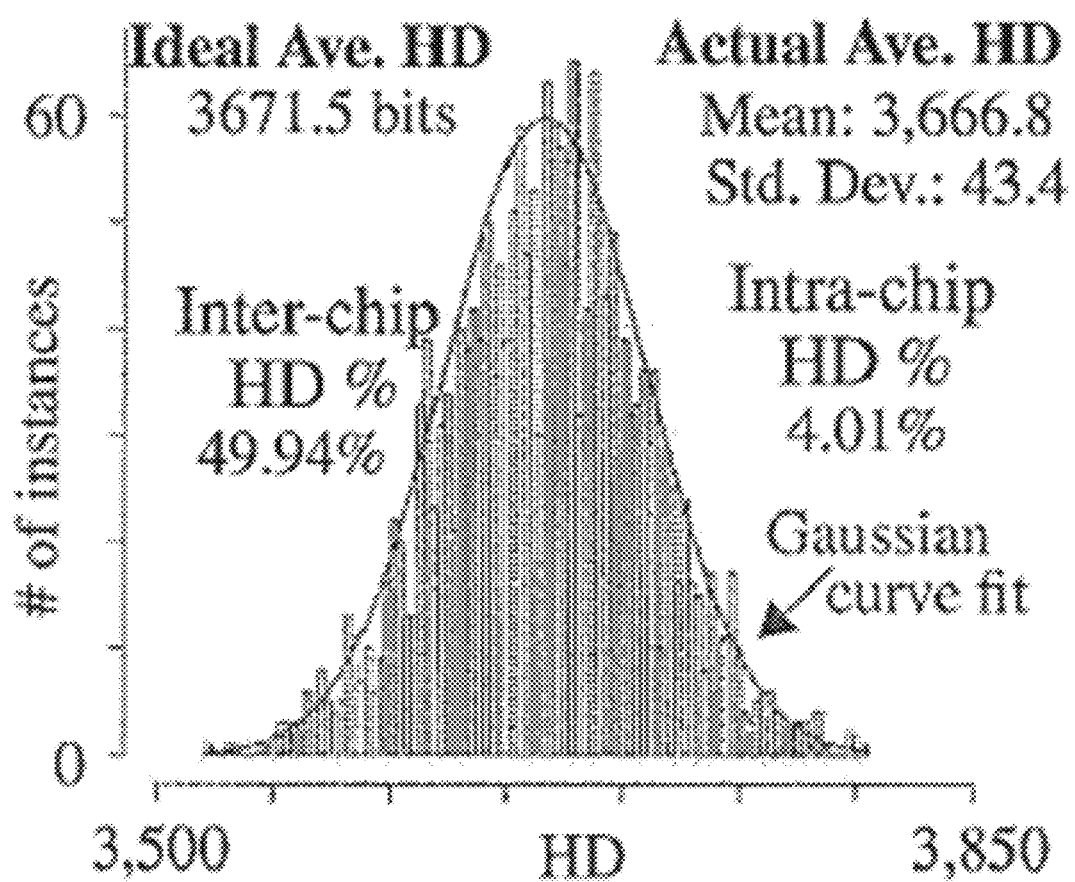
FIG. 5 is a graph illustrating an example distribution of hamming distances for example bitstrings generated according to techniques of this disclosure.

The results of applying the thresholding technique to 63 chips tested under nine TV corners are described below with respect to FIG. 5 and FIG. 6. An important concern regarding the thresholding technique deals with the fraction of bits that survive it. In experiments that were conducted, it was found that this fraction was different for the GND and $V_{DD}$ stacks. On average, approximately 50% of the comparisons using the GND PGVDs survive the thresholding, while only 22.5% of the comparisons survive using the $V_{DD}$ PGVDs. The lower value for the $V_{DD}$ PGVD analysis is believed to occur because of the increased noise levels on the $V_{DD}$ grid, relative to the GND grid. As a consequence, the average bitstring length reduces to approximately 7,765 bits (36.25%) from the original size of 21,420 bits. These bitstrings were found to be reproducible at all of the nine TV corners.

The true average intra-chip HD, which is a measure of the underlying bit stability across the TV corners, is computed as 4.01%. This value is obtained by analyzing the full length, i.e., 21,420-bit, bitstrings with thresholding disabled and counting the number of times a bit-flip occurs in each bit position across all pairings (9*8/2=36) of the bitstrings produced under each of the nine TV corners for each chip. The average intra-chip HD, expressed as a percentage, is obtained by dividing the number of bit flips by 36*21,420, which is the total number of bit pairings inspected for each chip, and multiplying by 100. The value reported is the average of these percentages across all chips. Any value less than 5% is considered high quality according to the published literature on PUFs.

Interchip HD, as described above, measures the uniqueness of the bitstrings, where the best possible result is 50%, i.e., on average, half of the bits in the bitstrings of any two arbitrary chips are different. FIG. 5 is a graph illustrating an example distribution of hamming distances for example bitstrings generated according to techniques of this disclosure. FIG. 5 plots the distribution of interchip HDs. The 1,953 HDs included in the distribution of FIG. 5 are obtained by pairing the stable bitstrings from all chips under all combinations. The chip with the shortest stable bitstring is used to set the size of the bitstrings used in each HD calculation, requiring all bitstrings to be truncated to 7,343 bits. The average HD is 3,666.8 (49.94%), which is close to the ideal HD of 3761.5 (50%).

Experiments also evaluated randomness using the NIST statistical tests at the default significance level of 0.01. Given the relatively short length of the stable bitstrings, only 11 of the 15 NIST statistical tests are applicable. FIG. 6 is a graph illustrating the pass-fail rate of example integrated circuits implementing one or more techniques of this disclosure. The bar graph shown in FIG. 6 gives the number of passing chips on the z-axis for each of the 10 tests on the x-axis, and for each of 10 different seeds on the y-axis. The number of passing chips is in reference to passing the null hypothesis. The null hypothesis is specified as the condition in which the bitstring-under-test is random. Therefore, a good result is obtained when the number of chips that pass the null hypothesis is large.

Figure 6:
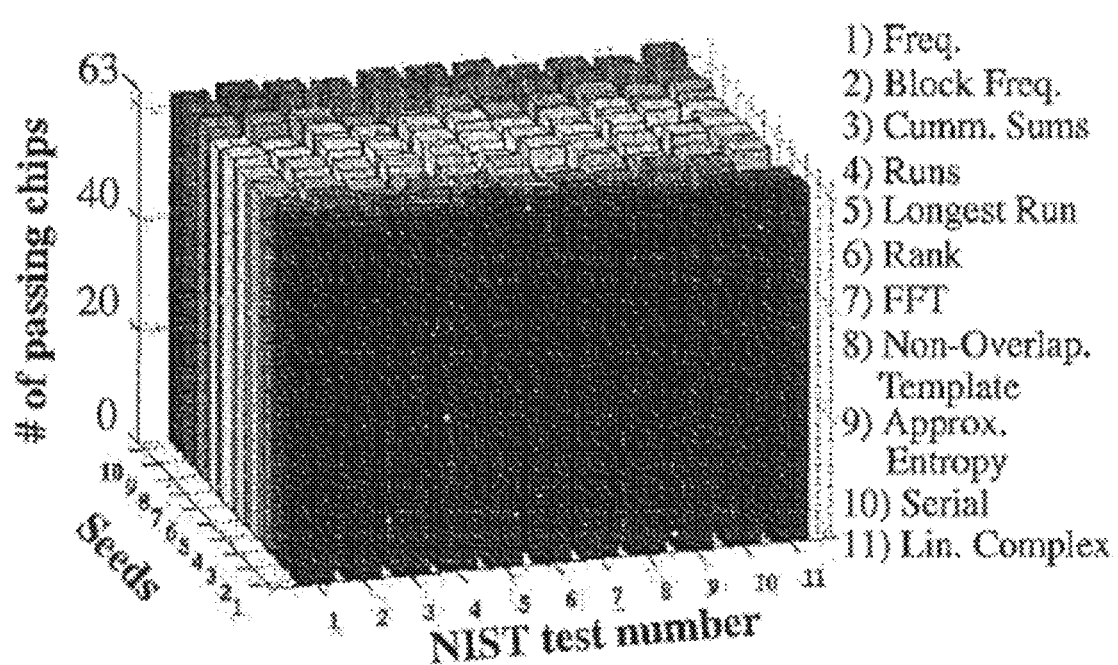
FIG. 6 is a graph illustrating the pass-fail rate of example integrated circuits implementing one or more techniques of this disclosure.

With 63 chips, NIST requires that at least 60 chips produce a p value that is larger than the significance level ($\alpha$=0.01), otherwise the whole test is considered 'failed.' In the graph illustrated in FIG. 6, overall, of the 11*10=110 bars, 41 are full height indicating that all 63 chips passed the test, 39 bars have height 62, 27 have height 61 and 2 have height 60. Therefore, 109 bars of the 110 are equal to or larger than the required value to pass the test, and only one bar is below the threshold at 58. The bars for the Non-Overlapping Template tests represent the average pass rate across all 148 individual tests. Of the 10*148=1,480 individual tests, 61 failed, 59 tests by no more than two chips, one by three chips (57 chips passed) and one by four chips (56 chips passed). Moreover, all but eight of Pvalue-of-the-Pvalues tests passed, indicating the P-values are uniformly distributed between 0.0 and 1.0. The fails in this category occurred in the Rank and Non-Overlapping Template tests, both which NIST recommends testing with much larger bitstrings than those used here. Overall, these are very good results and indicate the bitstrings generated using the PG PUF are cryptographic quality.

The large size of the bitstrings produced by the PUF can be used to further enhance their reliability over that provided by thresholding alone. This can be accomplished by creating three copies of a fixed-length bitstring from the sequence of strong bits produced by the PUF. The three copies can then be compared as a means of avoiding bit flips, in the spirit of a popular scheme used in fault tolerance called triple-module-redundancy or TMR. TMR is based on a majority voting scheme in which the final bit for a given bit position is obtained by taking the majority across all three copies of the bitstrings.

Figure 7A:
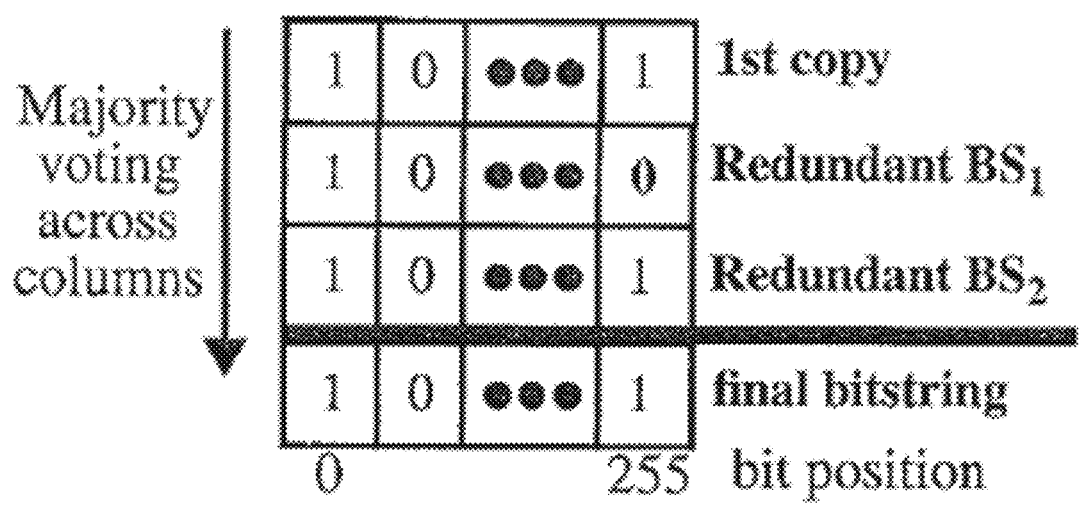
FIG. 7A is a conceptual diagram illustrating an example bitstring redundancy technique of this disclosure.

This technique was investigated using fixed-length bitstrings of 256-bits. FIG. 7A is a conceptual diagram illustrating an example bitstring redundancy technique. In one example, a TMR-based bitstring is created during enrollment by copying the first 256 strong bits into the first copy of the fixed-length bitstring as illustrated in FIG. 7A. The second two copies are created by parsing the remaining strong bits, searching for matches to the first copy. It should be noted that the TMR-based bitstring of length n requires approximately 5*n strong bits to construct. As described above for thresholding, the positions of the matching bits are indicated by writing a '1' in the public storage bitstring (not shown), while the positions of the skipped bits (and the weak bits encountered under thresholding) are indicated by writing a '0'. Later, during regeneration, the public storage bitstring is consulted to determine which challenges are to be used to reconstruct the three copies of the bitstring. Once created, the final bitstring is obtained by majority vote on each column as shown in FIG. 7A. This allows the correct bitstring to be generated despite any single bit-flips that may occur in a column, such as the one shown in FIG. 7A at the last column of Redundant $BS_1$.

Figure 7B:
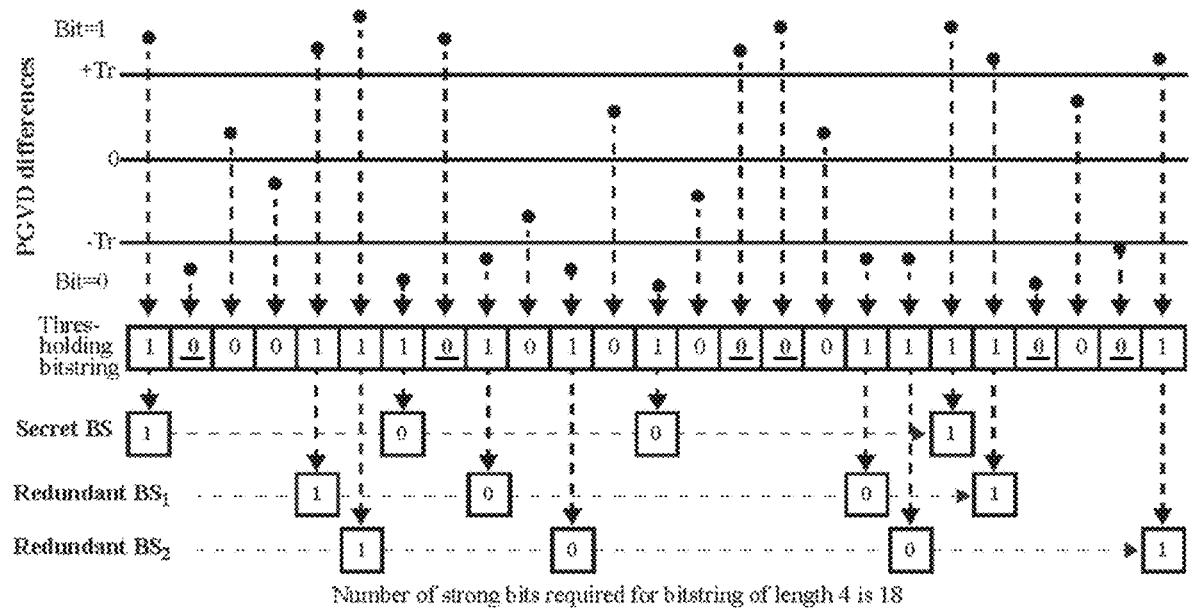
FIG. 7B is a conceptual diagram illustrating an example bitstring redundancy technique of this disclosure.

FIG. 7B illustrates a proposed thresholding and TMR-based scheme using data from a hypothetical chip. The x-axis in FIG. 7B plots a sequence of comparisons that may be used to generate a bitstring, while the y-axis plots the differences between the pairings of PGVDs. Each difference reflects the relative ordering of the two PGVDs, e.g., positive difference values indicate that the first PGVD is larger than the second. For strong bits, in one example, the PGVD difference data points must lie above or below the thresholds, labeled '+Tr' and '−Tr' in FIG. 7B. This condition, when met, is recorded using a '1' in the thresholding bitstring shown below the data points. Weak bits, on the other hand fall within the thresholds and are indicated with a '0'. Weak bits, which are denoted as underlined '0's in FIG. 7B indicate strong bits that are skipped under the TMR scheme described below. The example TMR-based technique illustrated in FIG. 7B constructs 3 identical bitstrings during enrollment, labeled 'Secret BS', 'Redundant BS1' and 'Redundant BS2' as shown along the bottom of FIG. 7B. The first strong bit encountered in the left-to-right sequence is placed into the first bit position of the 'Secret BS' copy. This '1' bit constrains the first bit of the redundant BSx to '1'. Therefore, the left-most strong '0' bit encountered next needs to be skipped. The two redundant strong '1's are found in column positions 5 and 6. The next strong bit, a '0' in this case, defines the second bit in the 3 bitstrings and the process continues. The number of strong bits required to generate a secret bitstring of length 4 is approx 5× or 20. From the example, this is evaluated by counting the number of '1's and bolded '0's in the thresholding bitstring, which is given as 18.

In order to illustrate the improvement provided by TMR over voltage thresholding alone, the GND threshold scalar given above as 0.37, was iteratively decreased in 0.01 steps down to 0.0. As the threshold was decreased, bit flips begin to occur in the thresholding-only bitstrings. A thresholding-only 'probability of failure' curve can be constructed by counting the number of bit flips that occur in the bitstrings from all 63 chips and dividing it by the total number of bits. A similar curve can be constructed using TMR, but in this case, a bit flip is not counted unless it occurs in two or more of the three bits of a column as shown in FIG. 7A. Moreover, the total number of bits used in the denominator for the TMR-based curve is reduced by a factor of three to account for the actual number used in the final TMR-based bitstring.

Figure 8:
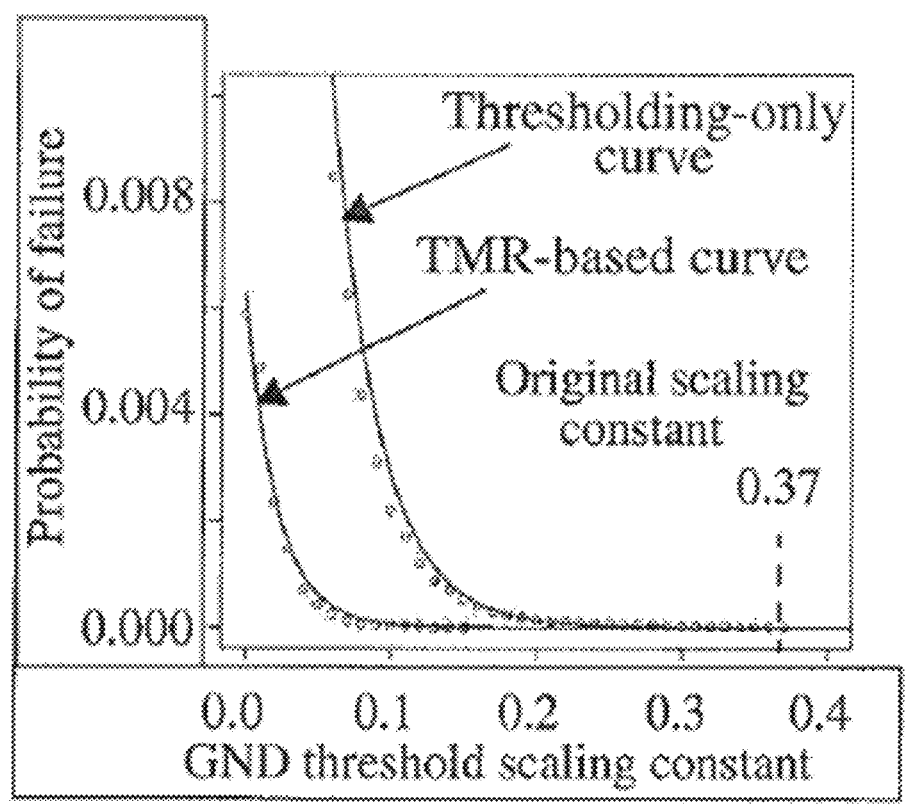
FIG. 8 is a graph illustrating an example technique for improving bitstring stability.

FIG. 8 plots the data points for these two curves as well as two 'exponential-curve' fits to them. In FIG. 8, the GND threshold scaling constant is plotted along the x-axis against the probability of failure on the y-axis. The exponential curve fits allow the probability of failure to be predicted for thresholds beyond (i.e., to the right) of the last recorded bit flip in the relatively small population of chips. For example, the probability of failure using voltage thresholding alone at the 0.37 threshold is 6.5E-7. This improves by nearly three orders of magnitude to 2.4E-10 using the TMR-based scheme. Of course, the TMR-based scheme can be expanded to further improve bit-flip resilience by generating five (or more copies) of the bitstring, at the expense of increased usage of bits and public storage size.

Figure 9:
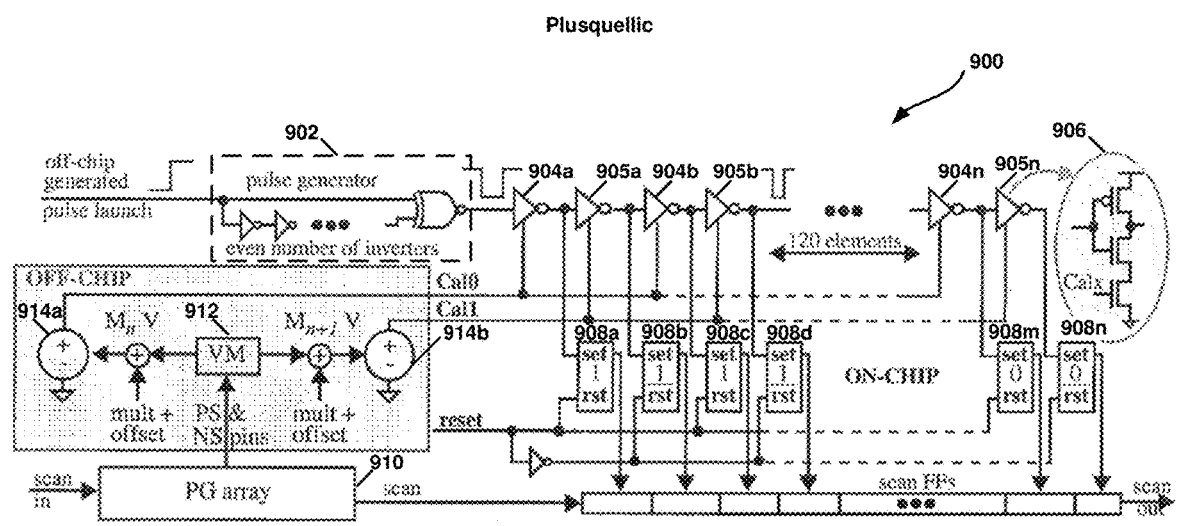
FIG. 9 is a schematic diagram illustrating an example of a voltage-to-digital converter (VDC) that may implement one or more techniques of this disclosure.
Figure 11:
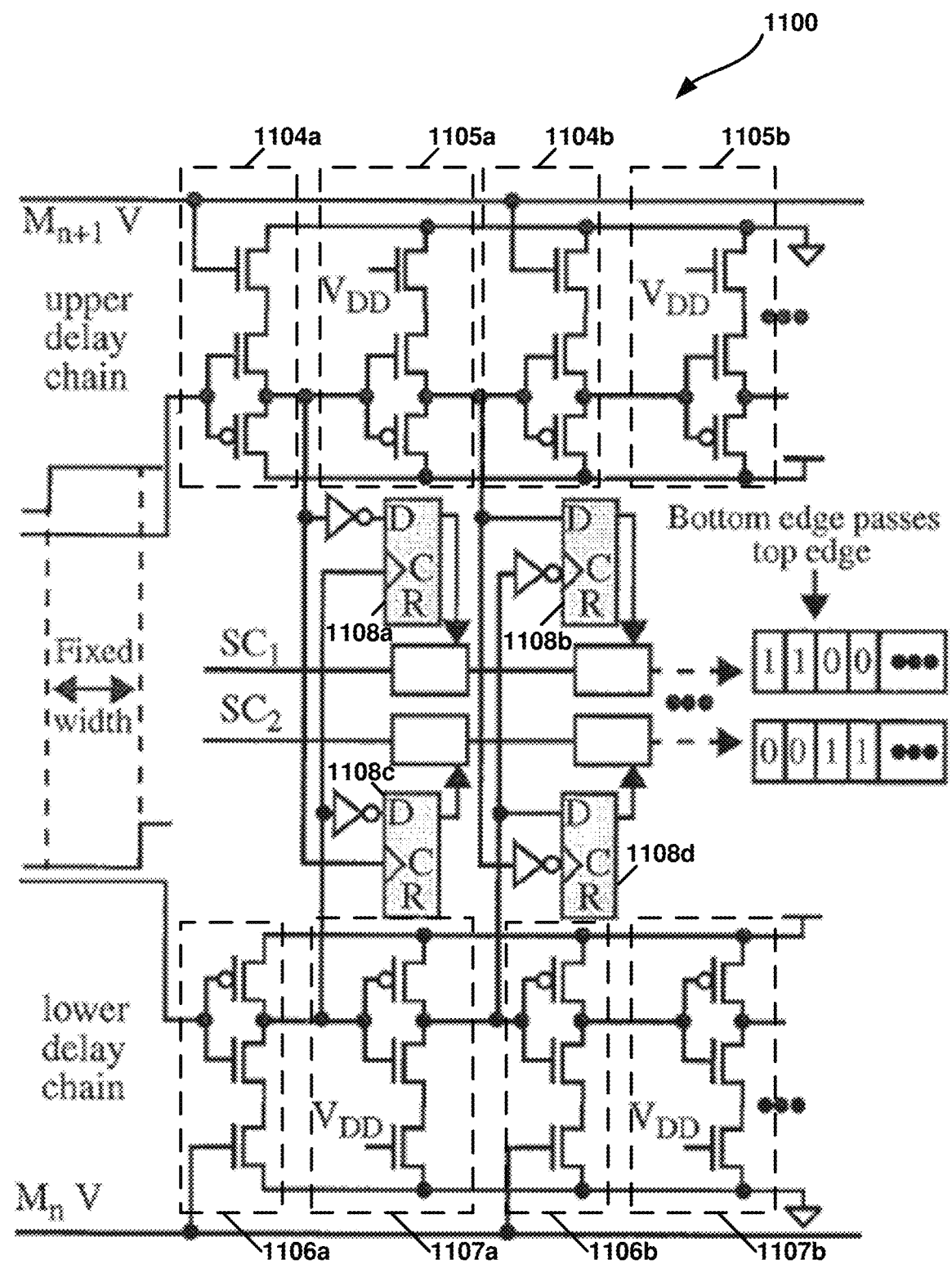
FIG. 11 is a schematic diagram illustrating an example of a voltage-to-digital converter (VDC) that may implement one or more techniques of this disclosure.
Figure 12:
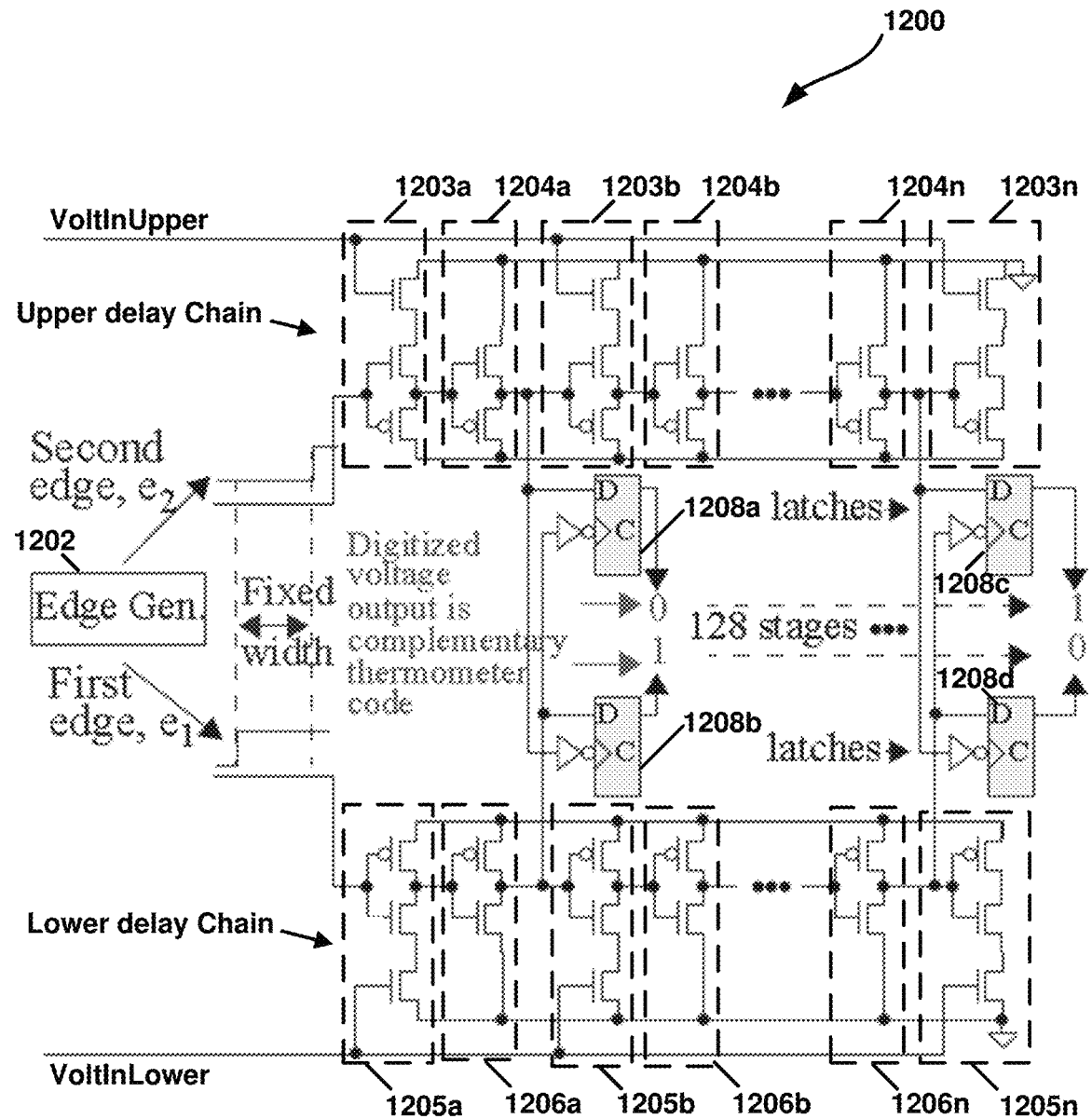
FIG. 12 is a schematic diagram illustrating an example of a voltage-to-digital converter (VDC) that may implement one or more techniques of this disclosure.

In the experiments described above, digitized voltages were obtained from an off-chip voltmeter. As described above, PUFs may be implemented using on-chip voltage-to-digital converters. Each of FIG. 9, FIG. 11, and FIG. 12 illustrate examples of a voltage-to-digital converter (VDC) that may implement one or more techniques of this disclosure. The example on-chip VDC 900 illustrated in FIG. 9 is designed to 'pulse shrink' a negative input pulse as it propagates down an inverter chain. As the pulse moves down the inverter chain, it activates a corresponding set of latches to record the passage of the pulse, where activation is defined as storing a '1.' A thermometer code (TC), i.e., a sequence of Ts followed by a sequence of '0's, represents the digitized voltage.

On chip VDC 900 works by introducing a fixed-width (constant) input pulse, which is generated by the pulse generator 902 shown on the left side of the FIG. 9. Two analog voltages, labeled Cal0 and Cal1 connect to a set of series-inserted NFET transistors in the inverter chain, with Cal0 connecting to NFETs in even numbered inverters 904a-904n and Cal1 to the NFETs in odd numbered inverters 904a-904n. An example of an inverter is illustrated in the call-out 906 on right side of FIG. 9. The propagation speed of the two edges associated with the pulse are controlled separately by these voltages. The pulse will eventually die out at some point along the inverter chain when the trailing edge of the pulse 'catches up' to the leading edge. This may be ensured by fixing Cal0 at a voltage higher than Cal1. The digital representation of the applied Cal0 and Cal1 voltages can then be obtained by counting the number of sequentially stored '1's in the latches 908a-908n.

As described above, PGVDs are created by subtracting the voltages measured on consecutive metal layers in the power grid. Instead of digitizing these PGVs one-at-a-time with a VDC and then subtracting them, the difference operation can be carried out in the analog domain by applying the two voltages from consecutive metal layers to the Cal0 and Cal1 inputs. The larger PGV from the lower metal layer, $M_n$, of the pair may be applied to Cal0 while the PGV from the adjacent, higher metal level layer, $M_{n+1}$, may be applied to Cal1 (voltage drops are used for the $V_{DD}$ grid voltages, e.g., $V_{DD}-V_{Mn}$).

FIG. 9 shows an example of how this may be accomplished. The PG array 910 is configured to enable the PGV on $M_n$ to drive the NS (or PS) pin and an off-chip voltmeter (VM) 912 is then used to digitize the value (same process as described for the experiments described above). The PGV is then multiplied by 15 and added to an offset, and the voltage sum is used to program an off-chip power supply 914a which drives Cal0. The same process may be carried out for the PGV produced on metal layer $M_{n+1}$ except the final value is used to program a second off-chip power supply 914b which drives Cal1. In this example, the multiplication and offset operations are necessary because VDC 900 requires the Cal0 and Cal1 voltages to be set between 500 mV and $V_{DD}$ for proper operation.

It should be noted that unlike the off-chip voltmeter in the PGV experiments in described above, the on-chip VDC 900 is subjected to the same TV variations as the PUF (as would be the case in actual implementation), and therefore its characteristics will vary as well. In one example, a calibration process may be used to 'tune' the offset voltage to compensate for some of the changes in VDC 900 behavior, but since the measurements are differential, VDC 900 is able to self-calibrate and cancel out most of the adverse effects of TV variations by itself.

The same set of experiments were carried out and the same processes were followed as described above on the 63 chips using VDC 900 instead of an off-chip voltmeter. The results were as follows. The average bitstring length after thresholding was 8,388 bits (39.16%) and the shortest one (used to truncate the bitstrings from the other chips for the statistical tests) was 7,506 bits. Both of these numbers are slightly larger than the numbers obtained using the PGVs, as described in above, and indicates that the VDC 900 compensates for some of the TV variations that occur in the measured PGVs.

Figure 10:
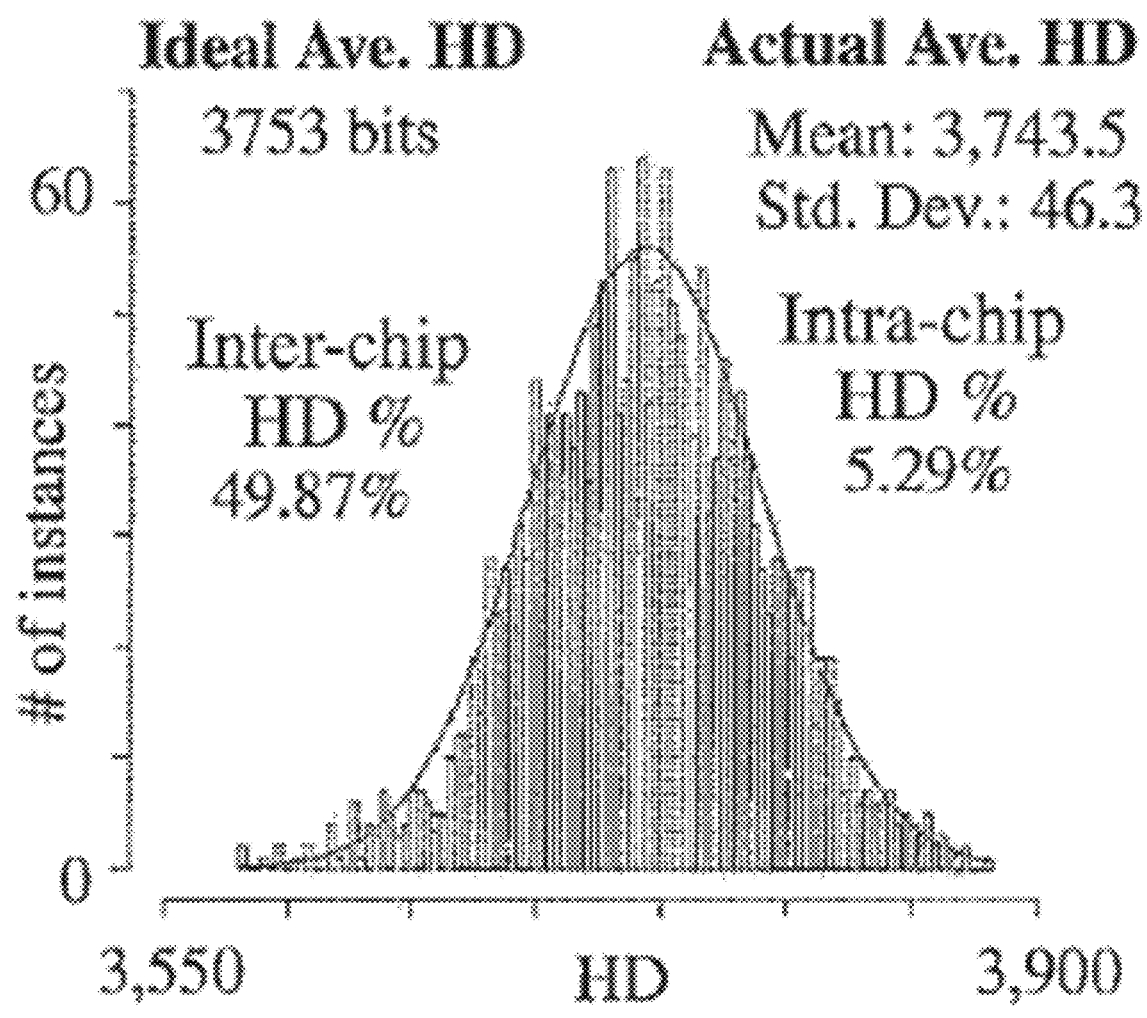
FIG. 10 is a graph illustrating an example distribution of hamming distances for example bitstrings generated according to techniques of this disclosure.

However, on the other hand, the statistical test results for the on-chip VDC-based bitstrings are slightly worse than those presented for the PGVs. FIG. 10 shows the HD distribution of the bitstrings and several statistical results, in the same graphical format as FIG. 5 for the PGVs. Although the interchip HD is close to the ideal of 50% at 49.87%, the value obtained for the PGVs is slightly better (49.94%). Moreover, the standard deviation of 46.3 bits given in FIG. 10 is slightly larger than that given in FIG. 5 of 43.4 bits, primarily due to the longer tail on the left side of the graph in FIG. 10. The VDC-based bitstrings were tested using the same 11 NIST statistical tests listed in FIG. 6, but using only the first seed. Although most tests were passed, the Runs and Approx. Entropy tests failed with 57 and 49 chips passing, respectively, and 20 of the 148 Non-Overlapping Template tests failed.

In summary, the digitization process carried out by on-chip VDC 900 works well, but may not be as efficient as the off-chip voltmeters at removing the bias that exists in the PGVs. In J. Ju et al., "Bit String Analysis of Physical Unclonable Functions based on Resistance Variations in Metal and Transistors," HOST, 2012, pp 13-20, which is incorporated by reference in its entirety, it is shown that a 'bowl-shaped' pattern exists in the M1 voltages across the 2-D array of SMCs and indicated that computing inter-metal layer voltage differences (as is done here) effectively eliminates it. A problem with using VDC 900 to compute the analog difference directly deals with the different sensitivities that exist for Cal0 and Cal1. In particular, Cal1 has higher sensitivity than Cal0, and therefore, the amplification factors for voltages applied to Cal0 and Cal1 need to be different (as described above, 15 was used for both factors in the experiments).

The asymmetry in the sensitivities behaves as follows. Assuming that the $M_n$ voltage from VDC 900 increases by a fixed constant $\Delta V$ and the $M_{n+1}$ voltage remains constant. Under these conditions, assuming the TC for these two measurements is equal to x. In contrast, a similar scenario where the voltage $M_n$ remains fixed and the $M_{n+1}$ voltage increases by the same fixed constant $\Delta V$ does not result in the same TC. Instead, the TC is equal to y, where y>x. In other words, a delta change in the upper metal layer ($M_{n+1}$) voltage has a larger impact on the change in the TC than it does for an equivalent lower metal layer ($M_n$) voltage change. Therefore, the TCs weigh the voltage change in the lower metal layer less than a change in the upper metal layer, which distorts their relationship to the actual voltage difference.

A second problem with VDC 900 as shown in FIG. 9 is that it may be susceptibility to differential power attacks (DPA). A DPA is a statistical technique that is used to steal secrets embedded within ICs. It works by deducing internal states (and secrets) of an IC by analyzing power supply transients that are generated from operating a functional unit, such as the Advanced Encryption Engine. The pulse-shrinking behavior of VDC 900 makes it relatively easy to determine the TC code for a given voltage difference measurement. The power transient generated by VDC 900 simply stops when the pulse shrinks and disappears and therefore, the length of the power transient is proportional to the TC.

An example architecture of a VDC that addresses this issue is shown in FIG. 11. FIG. 11 is a schematic diagram illustrating an example of a voltage-to-digital converter (VDC) that may implement one or more techniques of this disclosure. As illustrated in FIG. 11, in VDC 1100 the two GND PGVs from the $M_n$ and $M_{n+1}$ metal layers drive the even-numbered current starved inverters 1104a-1104b and 1106a-1106b within two identical delay chains, one shown along the top of the figure and one along the bottom. A rising transition is introduced into the top delay chain ahead of the rising transition introduced into the lower delay chain. Given that the $M_{n+1}$ voltage is lower than the $M_n$ voltage, the top delay chain propagates the edge more slowly, and eventually, the edge propagating along the bottom delay chain passes the top edge. Similar to VDC 900 in FIG. 9, as the edges propagate, each records a '1' in a latch as long as it precedes in time the edge on the other delay chain. Otherwise a '0' is stored. The duality of the delay chains causes complementary TCs to be stored in the latches 1108a-1108n, which are subsequently transferred to the scan chain. An example test result is given in the center right of FIG. 11 which shows the complementary TCs that are produced when the bottom edge passes the top edge at the third latch (not shown).

Although the example architecture of VDC 1100 illustrated in FIG. 11 is almost two times larger in area than the VDC 900 shown in FIG. 9, it provides a significant advantage. The power transient signature remains constant when the bottom edge passes the top edge, so it is difficult or impossible for an adversary to determine the precise time at which this occurred. Although some information is revealed at the end of the power transient that reflects the additional time taken by the top edge to propagate to the end of its delay chain relative to the bottom edge, it requires higher signal-to-noise ratios when analyzing the power transients to correlate it to the actual PGV voltages. Moreover, it is possible in this architecture to introduce a 'stop condition' where the signal propagation is halted in the top delay chain, effectively eliminating this type of information leakage. For example, by gating the $V_{DD}$ inputs on the top delay chain, it is possible to turn these inputs off at the instant the bottom edge propagates off the end of its delay chain. This action halts the propagation along the top scan chain (and the corresponding power transient) and therefore 'hides' the difference in their delays.

Another example architecture of a VDC that addresses the issues of VDC 900 is shown in FIG. 12. FIG. 12 is a schematic diagram illustrating an example of a voltage-to-digital converter (VDC) that may implement one or more techniques of this disclosure. As illustrated in FIG. 12, the inputs of VDC 1200 are two voltages labeled VoltInUpper and VoltInLower and two wires $e_1$ and $e_2$ that are connected to an Edge Generator 1202. VDC 1200 outputs two 128-bit thermometer codes (TCs) that reflect the magnitude of the sense voltage inputs. As described above, a TC is defined as a string of '0's (or '1's) followed by a string of '1's (or '0's).

As illustrated in FIG. 12, VDC 1200 is composed of two 256-stage delay chains, where the upper delay chain includes inverters 1203a-1203n and 1204a-1204n and the lower delay chain includes inverters 1205a-1205n and 1206a-1206n. The VoltInLower input connects to 128 NFETs, inserted in series with the odd-numbered inverters in the delay chain. VoltInUpper connects in a similar fashion to the upper delay chain. The PUF Engine (not shown in FIG. 12) starts the digitization process by driving a rising edge into Edge Generator 1202. Edge Generator 1202 passes $e_1$ to the corresponding VDC input, but delays $e_2$ by a $\Delta t$ (determined by 32-to-1 select MUX in one example). The two edges then 'race' down the two inverter chains at speeds relative to the magnitude of the VoltInUpper VoltInLower inputs.

Under the condition that VoltInUpper>VoltInLower, the edge propagating along the top delay chain eventually passes the edge on the bottom delay chain. The outputs of the even inverters along both delay chains connect to a set of latches 1208a-1208n that record the point at which this occurs. As shown in FIG. 12, the TC produced by the latches on the upper chain is a sequence of '0's followed by '1's, while a complementary pattern appears on the latch outputs of the lower chain. A value proportional to the magnitude of the voltage difference between VoltInUpper and VoltInLower can be obtained by counting the number of '1' in either of these TCs. In this manner, VDC 1200 represents an example of a device configured to digitize a PUF.

Above it was stated that leveraging metal resistance variations as the source of entropy for a PUF should be inherently more stable across environmental (TV) variations than leveraging transistor-based variations because metal resistance scales linearly with temperature and voltage. The PGVs used in the analysis presented above actually include variations from both sources. Although the shorting transistors included in SMC 200 are very large (e.g., 57× minimum size) and therefore exhibit smaller variations in comparison to minimum-sized transistors, they do introduce a component of entropy in the PGV analysis. The entropy works to improve the results, but the gain is reduced, as is shown below, because of the increased sensitivity of transistor-based variations to TV variations (hereafter called TV noise).

In one example transistor variations may be eliminated by dividing the PGV voltages by the shorting current. These values may be referred to as power grid equivalent resistances and referenced using the term PGERs. In order to get as 'pure' a form as possible of the PGERs, the leakage voltage and leakage current may also be subtracted from the values measured with the shorting transistors enabled. The expression for PGER is given by Equation 1:

$$PGER = \frac{Vshort - Vleak}{Ishort - Ileak} \qquad \text{Equation 1}$$

It should be noted that the four measurements used to define the PGER each may add measurement noise, which is separated and distinguished in this analysis from TV noise through sample averaging. The PGER differences (PG-ERDs) are created by subtracting pairings of PGERs, as was done for PGVs as described above.

One of the objectives of the analysis was to show that the PGERDs are more resilient to TV variations than are the PGVDs. In order to determine the magnitude of the TV variations (or 'noise'), the PGVD and PGERD data was calibrated. Calibration removes the DC offsets introduced by TV noise in the data, but preserves the variation. Calibration may be carried out by computing the mean PGERD and PGVD over the entire set of SMCs for a given metal layer pairing and TV corner. Correction factors may then be computed by subtracting the mean value at each of the TV corners from a reference TV corner. The reference is the data collected at 25° C., 1.2V. The correction factors are then added to the corresponding data from the TV corners.

Figure 13A:
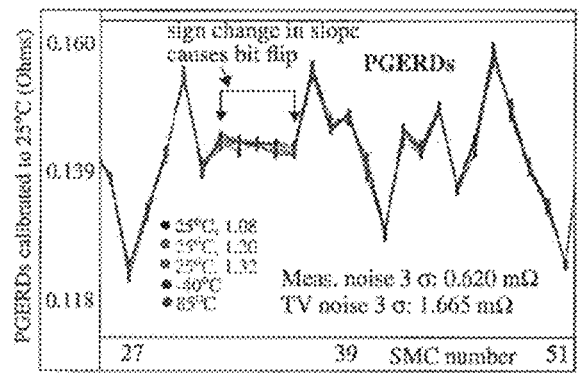
FIG. 13A-13B are graphs illustrating of an examples measuring difference values for use in an example PUF described herein.
Figure 13B:
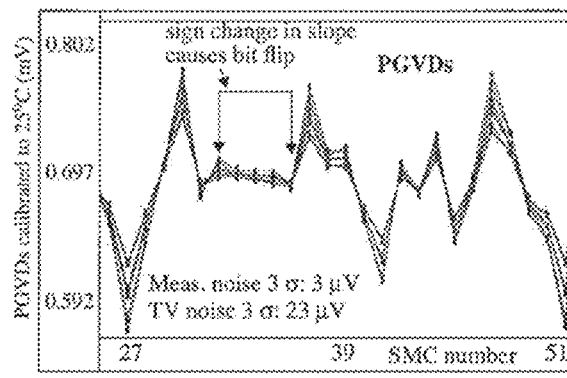

A subset of the calibrated $M_2$-$M_3$ PGERDs and PGVDs computed using data from one of the chips is shown in the graphs illustrated in FIG. 13A and FIG. 13B, respectively. In FIGS. 13A-13B the SMC number is given along the x-axis and the PGERD or PGVD calibrated to 25° C. is plotted along the y-axis. Each point in the curves is the average of 11 samples (the samples are also plotted as unconnected points to illustrate measurement noise). The averaging eliminates most of the measurement noise. Therefore, variations in the line-connected curves are introduced primarily by TV noise.

The 3σ values listed in the PGERD plot indicate that TV noise is approx. 2.7 times the measurement noise (1.665/ 0.620). Bitflips occur when the slopes of the lines between any two adjacent pairing of points reverses sign (examples are shown in FIG. 13A). In contrast, the ratio increases to 7.7 (23/3) for the PGVD analysis. Therefore, TV noise is nearly three times more likely to introduce a bitflip in the PGVD analysis than in the PGERD analysis.

Figure 14:
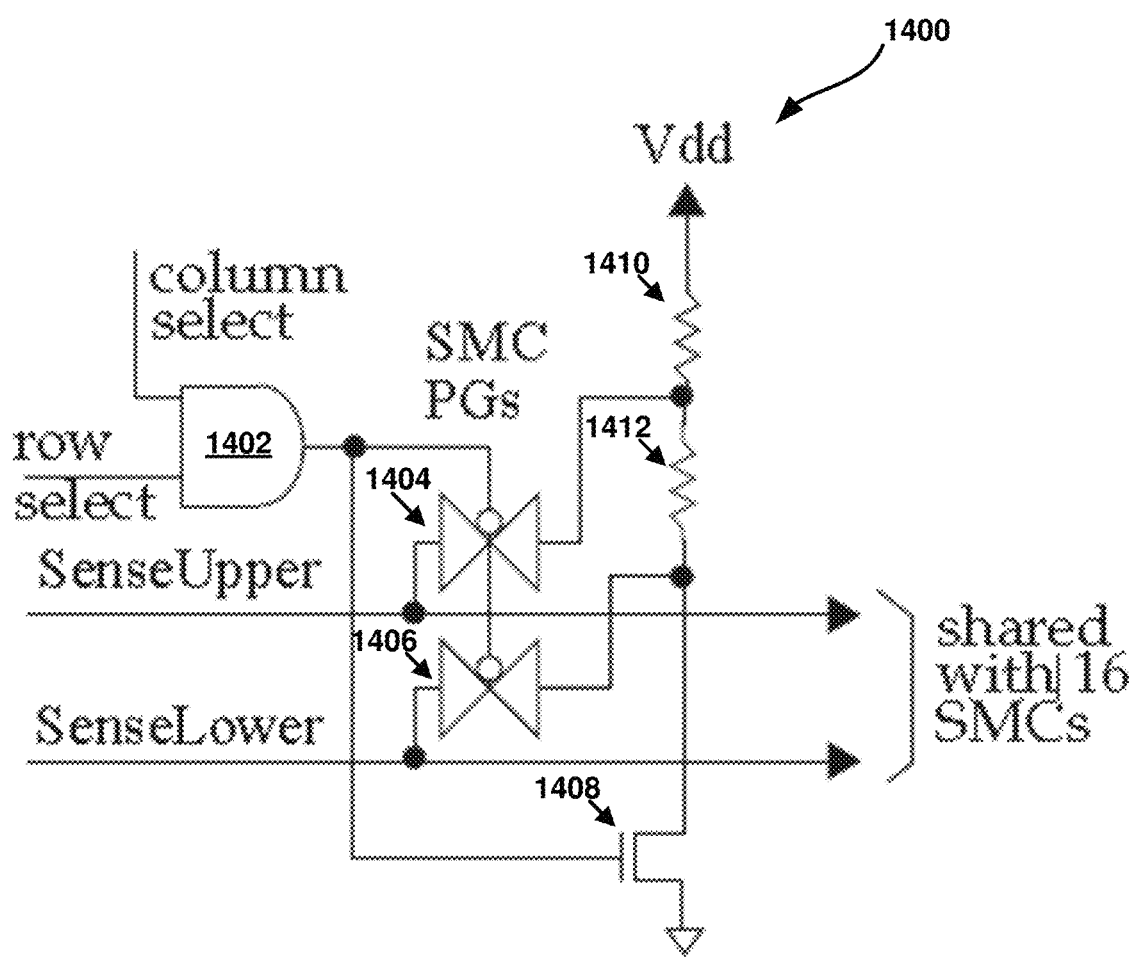
FIG. 14 is a schematic diagram illustrating an example of a circuit that may implement one or more techniques of this disclosure.

As described above, Equation 1 requires measuring current values. Measuring current on chip may be difficult. FIG. 14 illustrates a schematic diagram of an example measurement circuit that may be used as an alternative to measuring current values on chip. In one example, circuit 1400 may normalizes voltage drops for SMCs within the block to a reference current. As illustrated in FIG. 14, circuit 1400 includes AND gate 1402, pass gate 1404, pass gate 1406, NFET 1408, resistor 1410, and resistor 1412, which represents the entropy source. AND gate 1402 may be configured to enable a particular SMC. Pass gate 1404 and pass gate 1406 may be connected across an entropy source. For example, pass gate 1404 and 1406 may be respectively connected to PS and NS. NFET 1408 may be configured to provide stimulus when an SMC is enabled. In one example, NFET 1408 may be configured to provide 500 µA when SMC is enabled. Resistor 1410 may be a controlled-resistance silicide poly resistor. In one example, resistor value 1410 may have a resistance value of approximately 400 Ohms. In this manner, when an SMC is enabled, the NFET 1408 current creates a voltage drop across the entropy source which can be sensed by pass gate 1404 and pass gate 1406. Circuit 1400 may allow voltage variations introduced by the different NFET currents within the SMCs of the block to be eliminated. The process, may be referred to as called normalization and is described below.

The objective of normalization may be to eliminate transistor current variations as a component of the measured voltage drops across the entropy stack. Previous work suggests that the current-induced variations contribute significantly to TV noise, which, in turn, acts to reduce the probability of correctly regenerating the bitstring. Normalization may be thought of as a process that 'normalizes' the voltage drops for all SMCs within the block to a reference current. Normalization is derived from the basic circuit theory equation R=V/I given by Equation 2 below which states that the resistance of the entropy source can be obtained from the sense voltage measurements by dividing through by the NFET current. Unfortunately, measuring currents on-chip is challenging and impractical.

$$R = \frac{(VsenseUpper - VsenseLower)}{INFET} \qquad \text{Equation 2}$$

Equation 3 provides an alternative in cases where it is only necessary to determine a value that is 'proportional' to resistance. Here, DVSenseUpper is the digitized voltage (a value between 0 and 128 from the VDC) that is produced at the higher voltage point across the entropy source as shown in FIG. 14. Current from the enabled stimulus-measure-circuit (SMC) in the block flows across the $R_{parasitic}$, (1410). Therefore, the voltage drop defined by (129−DVSenseUpper) is proportional to the NFET current.

$$R = \frac{(DVsenseUpper - DVsenseLower) \times 256}{(129 - DVsenseUpper)} \qquad \text{Equation 3}$$

In this manner, the circuits described herein represent example circuits configured to generate physical unclonable functions. Various examples have been described. These and other examples are within the scope of the following claims.

What is claimed is:

1. A device for generating a digital value for a physically unclonable function, the device comprising:
a first voltage input,
a second voltage input,
an edge generator, wherein both the first voltage input and the second voltage input are connected to the edge generator,
an upper delay chain including one or more odd-numbered upper inverters and one or more even-numbered upper inverters,
a lower delay chain including one or more odd-numbered lower inverters and one or more even-numbered lower inverters,
one or more field effect transistors, wherein the first voltage input connects to the upper delay chain through the one or more field effect transistors and the second voltage input connects to the lower delay chain through the one or more filed effect transistors,
a first output of a first thermometer code from the upper delay chain and a second output of a second thermometer code from the lower delay chain, wherein a value proportional to a voltage difference between the first voltage input and the second voltage input is obtained based on one or more of the first thermometer code and the second thermometer code.

2. The device for generating a digital value for a physically unclonable function according to claim 1, wherein the one or more field effect transistors are inserted in series with the odd-numbered upper inverters and the odd-numbered lower inverters.

3. The device for generating a digital value for a physically unclonable function according to claim 1, wherein the field effect transistor is a NFET.

4. The device for generating a digital value for a physically unclonable function according to claim 1, wherein the thermometer code is a 128-bit thermometer code.

5. The device for generating a digital value for a physically unclonable function according to claim 1, wherein the first thermometer code is a string of '0's followed by a string of or a string of followed by a string of '0's.

6. The device for generating a digital value for a physically unclonable function according to claim 1 further comprising one or more sets of latches.

7. The device for generating a digital value for a physically unclonable function according to claim 6, wherein the first output from the upper delay chain and the second output from the lower delay chain each connect to the one or more sets of latches.

8. A method for generating a digital value for a physically unclonable function comprising the steps of:
    connecting an edge generator to both a first voltage input and a second voltage input,
    providing an upper delay chain and a lower delay chain, each delay chain including one or more odd-numbered inverters and one or more even-numbered lower,
    connecting through one or more field effect transistors the first voltage input to the upper delay chain and the second voltage input to the lower delay chain,
    generating a first thermometer code from the upper delay chain and a second thermometer code from the lower delay chain,
    passing by the edge generator a first edge along the upper delay chain and a second edge along the lower delay chain,
    recording by one or more latches a point at which one of the first edge and the second edge passes the other edge along the delay chain,
    producing by each of the one or more latches a thermometer code for each of the upper delay chain and the lower delay chain,
    obtaining a value representing a voltage difference between the first voltage input and the second voltage input based on the thermometer code.

9. The method for generating a digital value for a physically unclonable function according to claim 8, wherein the producing step further comprises the steps of:
    generating a string of '0's followed by a string of or a string of followed by a string of '0's, and
    counting a number of times appears in each string.

10. The method for generating a digital value for a physically unclonable function according to claim 8 further comprising the step of eliminating transistor variations by dividing power grid voltages by shorting current.

* * * * *

UNITED STATES PATENT AND TRADEMARK OFFICE
CERTIFICATE OF CORRECTION

PATENT NO. : 10,671,350 B2
APPLICATION NO. : 16/051427
DATED : June 2, 2020
INVENTOR(S) : James Plusquellic It is certified that error appears in the above-identified patent and that said Letters Patent is hereby corrected as shown below:

In the Specification

Column 1, delete Lines 12-18:
"STATEMENT REGARDING FEDERALLY SPONSORED RESEARCH OR DEVELOPMENT
This invention was made with government support under CNS1018748 awarded by National Science Foundation (NSF). The government has certain rights in the invention."

Signed and Sealed this
Fourteenth Day of November, 2023

Katherine Kelly Vidal
*Director of the United States Patent and Trademark Office*